United States Patent Office 3,235,586
Patented Feb. 15, 1966

3,235,586
PRODUCTION OF HALOGENATED AROMATIC ACIDS AND SALTS
Paul E. Hoch, Youngstown, N.Y., assignor to Hooker Chemical Corporation, Niagara Falls, N.Y., a corporation of New York
No Drawing. Filed May 29, 1963, Ser. No. 284,785
20 Claims. (Cl. 260—515)

This application is a continuation-in-part of my copending applications Ser. No. 25,519 and Ser. No. 25,557, filed April 29, 1960, now abandoned.

This invention relates to processes for preparing dihaloaromatic acids, trihaloaromatic acids, and metal salts thereof.

In one embodiment, the present invention resides in a process for preparing compounds having the following structural formulas and mixtures thereof, and the alkali metal salts thereof:

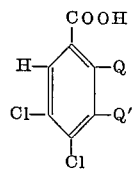

and

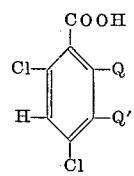

wherein Q is selected from the group consisting of hydrogen and alkyl containing from one to ten carbon atoms and wherein Q' is selected from the group consisting of hydrogen, alkyl containing from one to ten carbon atoms, phenyl, substituted phenyl, and carboxyl, and wherein Q and Q' form a cycloalkyl group when Q and Q' form a ring, provided that when Q' is hydrogen, Q must be hydrogen.

In another embodiment, the invention resides in a process for preparing compounds having the following structural formula, and the alkali metal salts thereof:

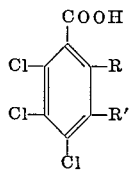

wherein R and R' are selected from the group consisting of hydrogen, alkyl containing from one to ten carbon atoms, phenyl, substituted phenyl mixtures thereof, and carboxyl, and wherein R and R' form a cycloalkyl group when R and R' form a ring.

The compounds of the invention are produced by reacting a halogenated, bicyclic ketone in accordance with the following typical reactions depending on which type of end product is desired. The dichloroaromatic compounds are prepared as follows:

(Ia) 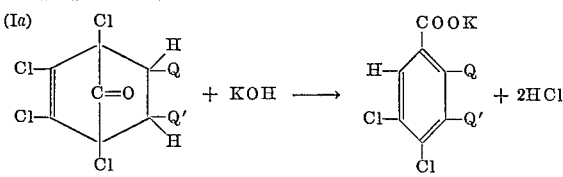

(IIa) 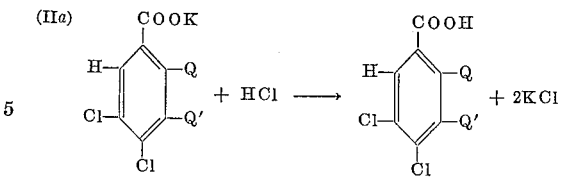

wherein Q and Q' are as defined above. The trichloroaromatic compounds are prepared as follows:

(Ib) 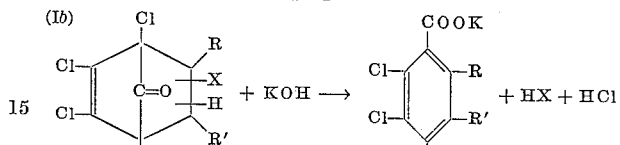

(IIb) 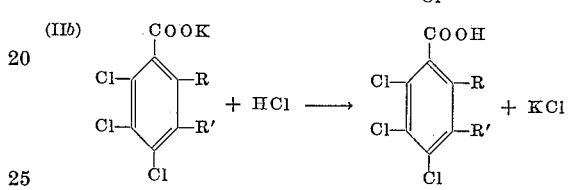

wherein X is selected from the group consisting of chlorine and bromine and wherein R and R' are defined as above. It was surprising and unexpected that the reaction of the present invention would proceed in accordance with Equations I and II above, since it could not be predicted that base treatment of the bicyclic carbonyl containing compounds of Equation I would result in cleavage to the acid. In reactions of this type, decarboxylation frequently results, i.e., complete removal of the carbonyl bridge.

In the production of the dichloroaromatic compounds, the reaction mixture generally contains the 2,4-dichloro aromatic compounds, in addition to the 3,4-dichloroaromatic compounds. The isomers can be separated from each other if desired. Direct production of the individual isomers is also contemplated.

In reaction I above, one mole of ketone is reacted with at least three moles of an alkali metal hydroxide, and preferably from four to six moles. Any alkali metal hydroxide, i.e., sodium, potassium, rubidium, and cesium, can be employed, but sodium or potasium are preferred due to availability and lower cost. A solvent should be used, with at least a major portion of the solvent being alcoholic in order to establish a basic medium for the reaction. The lower molecular weight alcoholic solvents, for example, the lower alkanols, such as methanol, ethanol, propanol or butanol, are preferred because the solubility of the alkali metal hydroxide is best in these; others that can be used include, for example, the higher molecular alcohols, benzene, toluene, xylene, and the like. The amount of solvent used is not critical, it being necessary only to maintain the solubility of the reactants. The reaction can be run in aqueous solution, if desired, but an alcoholic medium is preferred due to the aforesaid solubility factors. The reaction is highly exothermic and the reaction mixture will raise and reflux upon admixture of the reactants unless cooling is provided. The reaction is conveniently carried out at a temperature up to 145 degrees centigrade, generally in the range of 20 to 100 degrees centigrade, for a period from thirty minutes to three hours; however, neither the reaction time nor the reaction temperature is critical and, as will be apparent to one skilled in the art, wide variations in both can be tolerated.

The resultant alkali metal salt can then be recovered by conventional means and acidified to the free acid by conventional means, such as admixing with a mineral acid, for example, hydrochloric acid, sulfuric acid, phosphoric acid, and the like. The free acid can then be recovered by conventional means.

Typical compounds prepared by the process of the present invention include the compounds listed below. These compounds are given for the purpose of illustration only and are not to be construed as limiting the present invention. In the following list, the 3,4-dichloroaromatic acids have been given for purposes of illustration. It will be understood that in every case the 2,4-dichloroaromatic acids are also contemplated:

3,4-dichlorobenzoic acid
3,4-dichloro-5-methylbenzoic acid
3,4-dichloro-5-ethylbenzoic acid
3,4-dichloro-5-propylbenzoic acid
3,4-dichloro-5-butylbenzoic acid
3,4-dichloro-5-nonylbenzoic acid
3,4-dichloro-5-decylbenzoic acid
3,4-dichloro-5-phenylbenzoic acid
3,4-dichloro-5-(4-chlorophenyl)-benzoic acid
3,4-dichloro-5-(2,4-dichlorophenyl)-benzoic acid
3,4-dichloro-5-(4-nitrophenyl)-benzoic acid
3,4-dichloroisophthalic acid
3,4-dichloro-5,6,7,8-tetrahydro-1-naphthoic acid
3,4-dichloro-5,6-dimethylbenzoic acid
3,4-dichloro-5,6-diethylbenzoic acid
3,4-dichloro-5-methyl-6-ethylbenzoic acid
3,4-dichloro-5-methyl-6-hexylbenzoic acid
3,4-dichloro-5-propyl-6-methylbenzoic acid
3,4-dichloro-5-phenyl-6-methylbenzoic acid
3,4-dichloro-5-(4-chlorophenyl)-6-ethylbenzoic acid
3,4-dichloro-5-(4-nitrophenyl)-6-methylbenzoic acid
3,4-dichloro-6-methylisophthalic acid
3,4-dichloro-6-ethylisophthalic acid, and the corresponding alkali metal salts
2,3,4-trichlorobenzoic acid
2,3,4-trichloro-5-methylbenzoic acid
2,3,4-trichloro-6-methylbenzoic acid
2,3,4-trichloro-5-propylbenzoic acid
2,3,4-trichloro-6-hexylbenzoic acid
2,3,4-trichloro-5-nonylbenzoic acid
2,3,4-trichloro-6-decylbenzoic acid
2,3,4-trichloro-5-phenylbenzoic acid
2,3,4-trichloro-6-phenylbenzoic acid
2,3,4-trichloro-5-(4-chlorophenyl)-benzoic acid
2,3,4-trichloro-6-(4-nitrophenyl)-benzoic acid
2,3,4-trichloro-6-(2,4-dichlorophenyl)-benzoic acid
1,2,3-tricarboxy-4,5,6-trichlorobenzene
2,3,4-trichloro-5,6,7,8-tetrahydro-1-naphthoic acid, and the corresponding alkali metal salts.

The corresponding starting materials for the dichloroaromatic compounds are as follows:

1,4,5,6-tetrachlorobicyclo-(2.2.1)-5-heptene-7-one
1,4,5,6-tetrachloro-3-methylbicyclo-(2.2.1)-5-heptene-7-one
1,4,5,6-tetrachloro-3-ethylbicyclo-(2.2.1)-5-heptene-7-one, and the like.

Typical starting materials for the trichloroaromatic compounds are as follows:

1,2,4,5,6-pentachlorobicyclo-(2.2.1)-5-heptene-7-one
1,2,4,5,6-pentachloro-3-methylbicyclo-(2.2.1)-5-heptene-7-one
1,3,4,5,6-pentachloro-3-ethylbicyclo-(2.2.1)-5-heptene-7-one
1,3,4,5,6-pentachloro-3-methylbicyclo-(2.2.1)-5-heptene-7-one
1,3,4,5,6-pentachloro-2-phenylbicyclo-(2.2.1)-5-heptene-7-one
2,3-dicarboxy-1,2,4,5,6-pentachlorobicyclo-(2.2.1)-5-heptene-7-one
1,2,3,4,5-pentachlorotricyclo-(6.2.1.0$^{5,10}$)-undecane-11-one, and the like.

The starting materials of the present invention are known in the art, see McBee et al., JACS, 77, 385 (1955). The reactants for use in producing the dichloroaromatic compounds can be prepared in accordance with the following general equations, wherein Q and Q' are as defined above:

(IIIa)
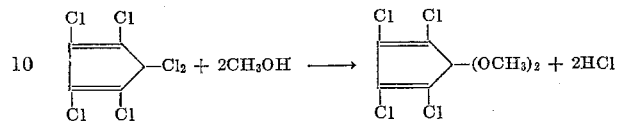

(IVa)
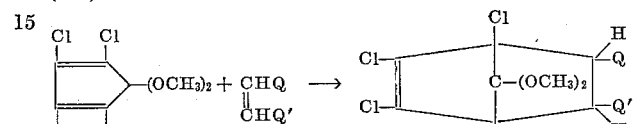

(Va)
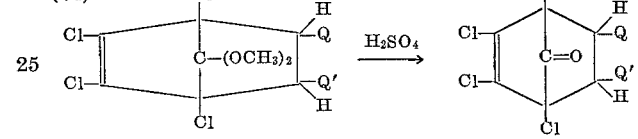

The reactants for use in producing trichloroaromatic compounds can be prepared in accordance with the following general equations, wherein R, R' and X are as defined above:

(IIIb)
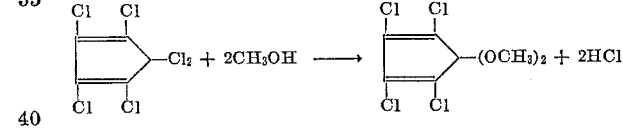

(IVb)
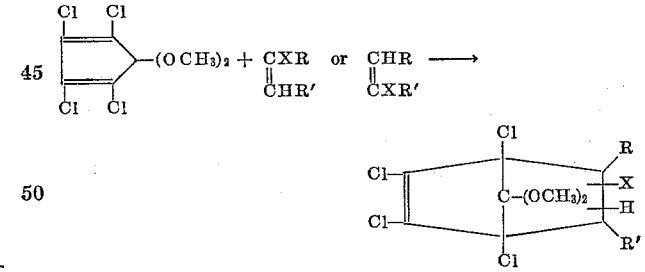
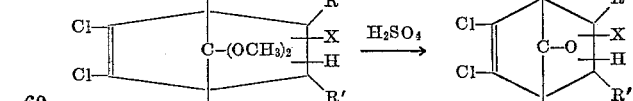

(Vb)
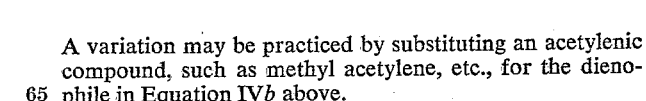

A variation may be practiced by substituting an acetylenic compound, such as methyl acetylene, etc., for the dienophile in Equation IVb above.

The compounds of the present invention find utility in the plastics industry, for example in the preparation of polyesters, surfactants, metal salt lubricants, plasticizers, chemical intermediates and flame retardant additives.

In order that those skilled in the art may have sufficiently detailed instructions for performing the processes and preparing the compounds of the present invention, the following examples will illustrate typical procedures. This detailed disclosure is not to be construed as limiting the scope of the present invention.

*Example 1.—Preparation of 1,4,5,6-tetrachloro-7,7-dimethoxy-3-carboxyethylbicyclo-(2.2.1)-5-heptene*

Equimolar quantities of the dimethyl ketal of hexachloropentadiene and ethylacrylate are heated together at a temperature of between about 140 and 150 degrees centigrade for about two hours. The expected Diels-Alder adduct which results, 1,4,5,6-tetrachloro-7,7-dimethoxy-3-carboxyethylbicyclo-(2.2.1)-5-heptene, is distilled at 133 degrees centigrade, 0.18 mm. pressure. The compound is obtained in 86 percent yield.

*Analysis.*—Calculated for $C_{12}H_{14}O_4Cl_4$: Cl, 39.0 percent. Found: Cl, 39.5 percent.

*Example 2.—Preparation of 1,4,5,6-tetrachloro-3-carboxyethylbicyclo-(2.2.1)-5-heptene-7-one*

To thirty grams of the Diels-Alder adduct obtained in Example 1 are added 80 milliliters of concentrated sulfuric acid. The mixture is stirred at a temperature of from 40 to 50 degrees centigrade for about three hours. The resulting suspension is poured into ice and water. The solid was collected by filtration. The carbonyl compound which results, 1,4,5,6-tetrachloro-3-carboxyethylbicyclo-(2.2.1)-5-heptene-7-one, is a pasty solid, which upon recrystallization from benzene melts at 101 to 102 degrees centigrade.

*Analysis.*—Calculated for $C_{10}H_8O_3Cl_4 \cdot H_2O$: C, 35.78 percent; H, 3.06 percent; Cl, 42.19 percent. Found: C, 35.69 percent; H, 3.07 percent; Cl, 42.15 percent.

*Example 3.—Preparation of 3,4- and 2,4-dichloro-isophthalic acid*

To 5.8 grams of the carbonyl compound prepared in Example 2, are added a solution of 5.3 grams potassium hydroxide in 75 milliliters of ethanol. The exothermic reaction which results is allowed to continue at reflux for about two hours. The resulting suspension was cooled and filtered to remove the sodium salt of dichloroisophthalic acid. The sodium salt was dissolved in 50 milliliters of water and the solution acidified with dilute (1:1) hydrochloric acid. The suspension resulting was chilled, then filtered. The solid after air drying was a mixture containing a major portion of the 3,4-isomer and a minor portion of the 2,4-isomer, weighed 3.5 grams and had a melting point upon recrystallization from acetic acid of 306 to 307 degrees centigrade.

*Analysis.*—Calculated for $C_8H_2O_4Cl_2$: C, 30.28 percent; neut. equiv., 117. Found: Cl, 29.94 percent; neut. equiv., 116.

In Example 1, acrylic ester was employed in the Diels-Alder adduction. It should be understood that 3,4- and 2,4-dichloroisophthalic acid of Example 3 may be conveniently prepared when any acrylic acid or acrylonitrile is employed in the Diels-Alder adduction (followed by the procedure of Examples 2 and 3.)

*Example 4.—Preparation of 3,4-dichloro- and 2,4-dichloro-5,6,7,8-tetrahydro-1-naphthoic acid*

A solution of 1.5 grams of potassium hydroxide (eighty-five percent) in twenty milliliters of absolute ethanol was warmed to reflux with stirring. To this solution was added during two minutes, 1.7 grams of recrystallized ketone, 1,2,3,4-tetrachlorotricyclo-(6.2.1.0$^{5,10}$)-undecane-11-one, i.e., the ketone derived from the ketal cyclohexene adduct. The suspension was refluxed for an additional two hours cooled and filtered. The ethanol was removed from the filtrate under vacuum and the pasty residue treated with ten milliliters of water. A very small amount of water in soluble solid was removed by filtration and the filtrate was acidified with hydrochloric acid (1:1). The gummy solid resulting upon acidification was washed with water, air dried overnight then taken up in refluxing cyclohexane. A crystalline solid weighing 0.25 gram (twenty-two percent), melting point 132 to 145 degrees centigrade was recovered which was a mixture of the 3,4- and 2,4-isomers. Several recrystallizations from cyclohexane and the benzene raised the melting point to 145 to 158 degrees centigrade.

*Analysis.*—Calculated for $C_{11}H_{10}Cl_2O_2$: C, 53.91 percent; H, 4.08 percent; Cl, 28.95 percent; neut. equiv., 245. Found: C, 54.07 percent; H, 4.04 percent; Cl, 28.87 percent; neut. equiv., 246.

*Example 5.—Preparation of 1,4,5,6-tetrachlorobicyclo-(2.2.1)-5-heptene-7-one*

A mixture of 71 grams of the ethylene-ketal adduct, 1,4,5,6-tetra-chloro-7,7-dimethoxybicyclo-(2.2.1)-5-heptene, and 140 milliliters of concentrated sulfuric acid was stirred for one hour at 30 to 35 degrees centigrade. Solid separated within one minute and formed in quantity throughout the reaction time. The suspension was poured into ice and water. The solid was collected by filtration and upon air drying overnight weighed 67 grams. This polyhydrate was placed under vacuum and warmed in an oil bath at one hundred and ten degrees centigrade for two hours. The solid obtained was recrystallized three times from benzene and vacuum dried overnight at 60 degrees centigrade. The pure solid obtained melted at 96.5 to 97.5 degrees centigrade.

*Analysis.*—Calculated for $C_7H_4Cl_4O$: Cl, 57.7 percent. Found: Cl, 57.5 percent.

*Example 6.—Preparation of 3,4- and 2,4-dichlorobenzoic acid*

A solution of 8.0 grams of potassium hydroxide (86 percent) in 75 milliliters of absolute ethanol was prepared and warmed to 60 to 65 degrees centigrade. To this solution was added portion-wise 7.7 grams of the ketone hydrate prepared in Example 5 over a period of one to two minutes. The suspension was stirred at reflux for two hours. The suspension was cooled and filtered to remove the salt. The filtrate was subjected to a vacuum stripping to remove the alcohol. The residue was dissolved in 50 milliliters of water and the solution acidified with dilute (1:1) hydrochloric acid. The suspension resulting was chilled then filtered. The solid after air drying several days weighed 3.5 grams (>sixty-one percent) melting point 153.6 to 154.8 degrees centigrade. This solid was recrystallized twice from nitromethane to yield 1.7 grams solid melting point 154 to 156 degrees centigrade.

*Analysis.*—Calculated for $C_7H_4Cl_2O_2$: C, 43.79 percent; H, 2.60 percent. Found: C, 43.71 percent; H, 2.31 percent.

A one-gram portion of the recrystallized acid above was refluxed with four milliliters of thionyl chloride for three hours. The thionyl chloride was removed and the residue submitted for an infrared analysis against standards for dichlorobenzoyl chlorides. The results indicated 80±5 percent 2,4-dichlorobenzoyl chloride, and 20±5 percent 3,4-dichlorobenzoyl chloride. There was no measurable indication of the 2,5- or 2,3-dichlorobenzoyl chloride isomers.

*Example 7.—Preparation of 3,4- and 2,4-dichlorobenzoic acid*

A solution of 8 grams potassium hydroxide (86 percent) in 75 milliliters of absolute ethanol was placed in a reactor maintained at 40 degrees centigrade in an ice bath. To this solution was added portion-wise 8 grams of the ketone hydrate prepared in Example 5 over a period of five minutes. The suspension was stirred for two hours, while maintained at a temperature of 40 to 45 degrees centigrade. The suspension was filtered to remove the salt. The filtrate was subjected to vacuum stripping to remove the alcohol. The residue was treated as in Example 6 to produce the mixture of dichlorobenzoic acids.

*Example 8.—Preparation of 1,4,5,6-tetrachloro-3-methyl-bicyclo-(2.2.1)-5-heptene-7-one*

A suspension of 7 grams of the propene-ketal adduct, 1,4,5,6-tetrachloro - 7,7 - dimethoxy - 3-methylbicyclo- (2.2.1)-5-heptene, and twenty milliliters of concentrated sulfuric acid was stirred vigorously for one hour at 45 to 50 degrees centigrade. The suspension was poured into 50 grams of ice and water. The solid that formed was collected on a filter. It was quite hygroscopic, tended to oil on the filter. This material was recrystallized several times from methylcyclohexane, with considerable loss, to yield a solid (melting point 57 to 59 degrees centigrade) weighing two grams (30 percent).

*Analysis.*—Calculated for $C_8H_6Cl_4O$: C, 36.96 percent; H, 2.31 percent; Cl, 54.58 percent. Found: C, 37.10 percent; H, 2.39 percent; Cl, 54.1 percent.

*Example 9.—Preparation of 3,4-dichloro- and 2,4-dichloro-5-methylbenzoic acid*

A solution of 17.6 grams of potassium hydroxide (85 percent) in 100 milliliters of absolute ethanol was prepared and warmed to 60 degrees centigrade. To this well-stirred solution was added portion-wise over five minutes 17 grams of the crude ketone prepared in Example 8. The suspension was refluxed an additional two hours, cooled and filtered. The ethanol was stripped from the filtrate under reduced pressure and the residue resulting dissolved in a minimum amount of water. The aqueous solution was acidified with dilute hydrochloric acid (1:1) and the resulting suspension cooled and filtered. The crude air dried solid weighed 13 grams (96 percent) and melted over a broad range (140 to 180 degrees centigrade). Recrystallization from cyclohexane gave 7 grams of solid melting point 172 to 182 degrees centigrade. The product was shown to be a mixture of 80±5 percent, 3,4-isomer, and 20±5 percent, 2,4-isomer, by oxidation with permanganate to the respective isophthalic acids and comparison with infrared standards for the two acids.

*Analysis.*—Calculated for $C_8H_6Cl_2O_2$: Cl, 34.6 percent; neut. equiv., 205. Found: Cl, 34.7 percent; neut. equiv., 204.5.

The following chart shows the preparation of other dichloroaromatic acids. These compounds are conveniently prepared in good yields in the manner of the foregoing examples. In every case, the prodct is a mixture of the 3,4- and 2,4-isomers.

| Example | Substituent Q | Substituent Q' | Compounds Used in Diels-Alder Adduction |
|---|---|---|---|
| 10 | Hydrogen | $C_4H_9$ | Hexene. |
| 11 | do | $C_6H_{13}$ | Octene. |
| 12 | do | $C_{10}H_{21}$ | Dodecene. |
| 13 | do | Phenyl | Styrene. |
| 14 | do | 4-chlorophenyl | 4-chlorostyrene. |
| 15 | do | 2,4-dichlorophenyl | 2,4-dichlorostyrene. |
| 16 | do | 4-nitrophenyl | 4-nitrostyrene. |
| 17 | Methyl | Phenyl | 1-phenylpropene-1. |
| 18 | (R and R' together form cyclopentyl). | | Cyclopentene. |

*Example 19.—Preparation of 1,2,4,5,6-pentachloro-7,7-dimethoxybicyclo-(2.2.1)-5-heptene*

Two hundred grams of 5,5-dimethoxy-1,2,3,4-tetrachlorocyclopentadiene was heated with stirring to 190 degrees centigrade and gaseous vinyl chloride was introduced beneath its surface. The flow rate of the vinyl chloride was not determined, but it was rapid and a considerable amount passed through the solution without reacting. After three hours the now viscous reaction mixture was distilled as a pale yellow oil, boiling point 89 to 90 degrees centigrade at 0.15 mm. pressure, $n_D^{25}$ 1.5330, and yield 141 grams (57 percent based on the ketal). The oil crystallized on standing and was recrystallized from methanol yielding colorless crystals having a melting point of 37 to 38 degrees centigrade.

*Analysis.*—Calculated for $C_9H_9Cl_5O_2$: Cl, 55.4 percent. Found: Cl, 55.5 percent.

*Example 20.—Preparation of 1,2,4,5,6-pentachlorobicyclo-(2.2.1)-5-heptene-7-one*

A suspension of fifteen grams of the compound obtained in Example 19 and 40 milliliters of concentrated sulfuric acid was stirred at 40 to 50 degrees centigrade in an open Erlenmeyer flask with a magnetic stirrer for two hours. The reaction mixture was poured into 200 milliliters of ice and water, followed by extracting with 150 milliliters of methylene chloride. The methylene chloride solution was washed with two 500 milliliter portions of water, then dried over anhydrous magnesium sulfate. The organic solvent was evaporated with slight warming under diminished pressure, yielding a brown oil residue weighing eleven grams. This crude product crystallized upon standing. Two recrystallizations of this material from cyclohexane yielded two grams of crystalline solid melting at 53 to 54 degrees centigrade. The product was dried under vacuum for four hours at 100 degrees centigrade.

*Analysis.*—Calculated for $C_7H_3Cl_5O$: Cl, 63.3 percent. Found: Cl, 63.0 percent.

*Example 21.—Preparation of 2,3,4-trichlorobenzoic acid*

A mixture containing three grams of the compound obtained in Example 20 dissolved in 33 cubic centimeters of ethanol was added to a solution of 2.2 grams of sodium hydroxide in 40 cubic centimeters of ethanol. The resultant exothermic reaction was stirred for fifteen minutes, after which time the alcoholic solvent was evaporated and the residue was dissolved in water. The aqueous solution was acidified with concentrated hydrochloric acid to a white, flocculent solid. The solid was filtered and air dried yielding a product weighing 2.5 grams and melting at 187 to 189 degrees centigrade. The product was recrystallized from benzene to give a product melting at 188 to 189 degrees centigrade. The melting point cited in the literature is 188 degrees centigrade.

The product was converted to the acid chloride by treatment with excess thionyl chloride. The spectrum of the acid chloride corresponds to the spectrum of the known 2,3,4-trichlorobenzoyl chloride. The melting point of the acid chloride was 64 to 65 degrees centigrade and the melting point cited in the literature is 64 degrees centigrade.

*Example 22.—Preparation of 2,3,4-trichlorobenzoic acid*

A mixture containing three grams of the compound obtained in Example 20 dissolved in 40 cubic centimeters of ethanol was added to a solution of two grams of sodium hydroxide in 40 cubic centimeters of ethanol maintained at a temperature of 40 degrees centigrade in an ice bath. The reaction mixture was stirred for 15 minutes while maintained at a temperature of 40 to 45 degrees centigrade. The alcoholic solvent was evaporated and the residue was treated as in Example 21 to produce the 2,3,4-trichlorobenzoic acid.

*Example 23.—Preparation of the anhydride of 2,3-dicarboxy-1,2,4,5,6-pentachloro-7,7-dimethoxy bicyclo-(2,2,1)-heptene-5*

A mixture of 100 grams of 5,5-dimethoxy-1,2,3,4-tetrachlorocyclopentadiene and 54 grams of chloromaleic anhydride was heated with stirring to 150 to 165 degrees centigrade for about thirteen hours. The reaction mixture was distilled under vacuum yielding a product boiling at 169 degrees centigrade at two millimeters pressure. The product weighed 129 grams (85 percent yield) and melted at 158 to 159 degrees centigrade.

*Analysis.*—Calculated for $C_{11}H_7Cl_5O_5$: Cl, 44.7 percent. Found: Cl, 43.3 percent.

*Example 24.—Preparation of 1,2,3-tricarboxy-4,5,6-trichlorobenzene*

A mixture of 15.3 grams of the compound obtained in Example 23 and 40 cubic centimeters of concentrated sulfuric acid was stirred with heating at 60 degrees centigrade for thirty minutes. The reaction mixture was poured into ice water and a solid was formed. The solid was collected and dissolved in 20 percent sodium hydroxide solution. The mixture was stirred for fifteen minutes, followed by acidification with concentrated hydrochloric acid. The solid product was collected and recrystallized from a water-ethanol solution. Four grams of product was isolated melting at 175 degrees centigrade.

*Analysis.*—Calculated for $C_9H_3Cl_3O_6$: Cl, 34.0 percent. Found: Cl, 33.1 percent.

The following chart shows the preparation of other trichloroaromatic acids. These compounds may be conveniently prepared in good yields in the manner of the foregoing examples.

| Ex. | Substituent R | Substituent R' | Compound Used in Diels-Alder Adduction |
|---|---|---|---|
| 25 | H | $CH_3$ | 2-chloropropene. |
| 26 | Phenyl | H | β-Chlorostyrene. |
| 27 | H | $C_3H_5$ | 2-chloropentene. |
| 28 | H | 2,4-dichlorophenyl | 2,4-dichloro-β-chlorostyrene. |
| 29 | (R and R' together form cyclopentyl). | | 1-chlorocyclopentene. |
| 30 | (R and R' together form cyclohexyl). | | 1-chlorocyclohexene. |

This invention may be embodied in other forms or carried out in other ways without departing from the spirit or essential characteristics thereof. The present embodiment is, therefore, to be considered as in all respects illustrative and not restrictive, and all changes which come within the meaning and range of equivalency of the claims are intended to be embraced therein.

I claim:

1. A process for preparing an alkali metal salt of a compound selected from the group consisting of compounds having the following formulas and mixtures thereof:

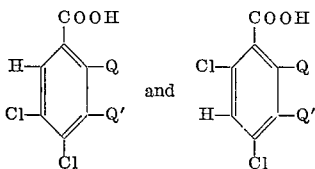

wherein Q is selected from the group consisting of hydrogen and alkyl containing from one to ten carbon atoms, and wherein Q' is selected from the group consisting of hydrogen, alkyl containing from one to ten carbon atoms, phenyl, chloro-substituted phenyl, nitro-substituted phenyl, and carboxyl, and wherein Q and Q' form a cycloalkyl group having five to six carbon atoms when Q and Q' form a ring, provided that when Q' is hydrogen Q is hydrogen, which comprises reacting together in a solvent and at a temperature up to about 145 degrees centigrade at least three moles of an alkali metal hydroxide and one mole of a compound having the following formula:

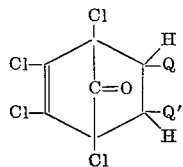

wherein Q and Q' are as defined above.

2. A process according to claim 1 wherein said alkali metal salt is acidified to the free acid, and the resultant product is recovered.

3. A process according to claim 1 wherein there are employed from four to six moles of an alkali metal hydroxide selected from the group consisting of sodium hydroxide and potassium hydroxide.

4. A process according to claim 1 wherein the solvent is a lower alkanol.

5. A process according to claim 2 wherein the alkali metal salt is acidified with hydrochloric acid.

6. A process for preparing a mixture of 2,4- and 3,4-dichloro-5,6,7,8-tetrahydro-1-naphthoic acids which comprises reacting together in a solvent and at a temperature up to 145 degrees centigrate four to six moles of an alkali metal hydroxide and one mole of 1,2,3,4-tetrachloro-tricyclo-(6.2.1.0$^{5,10}$)-undecane-11-one, acidifying the resultant metal salt to the free acid, and recovering a mixture of 2,4- and 3,4-dichloro-5,6,7,8-tetrahydro-1-naphthoic acids as a product of the process.

7. A process for preparing a mixture of 2,4- and 3,4-dichloro-5-hexylbenzoic acids which comprises reacting together in a solvent and at a temperature up to 145 degrees centigrade four to six moles of an alkali metal hydroxide and one mole of 1,4,5,6-tetrachloro-3-hexylbicyclo-(2.2.1)-5-heptene-7-one, acidifying the resultant metal salt to the free acid, and recovering a mixture of 2,4- and 3,4-dichloro-5-hexylbenzoic acids as a product of the process.

8. A process for preparing a mixture of 2,4- and 3,4-dichloro-isophthalic acids which comprises reacting together in a solvent and at a temperature up to 145 degrees centigrade four to six moles of an alkali metal hydroxide and one mole of 1,4,5,6-tetrachloro-3-carboxybicyclo-(2.2.1)-5-heptene-7-one, acidifying the resultant metal salt to the free acid, and recovering a mixture of 2,4- and 3,4-dichloroisophthalic acids as a product of the process.

9. A process for preparing a mixture of 2,4- and 3,4-dichloro-5-methylbenzoic acids which comprises reacting together in a solvent and at a temperature up to 145 degrees centigrade four to six moles of an alkali metal hydroxide and one mole of 1,4,5,6-tetrachloro-3-methylbicyclo-(2.2.1)-5-heptene-7-one, acidifying the resultant metal salt to the free acid, and recovering a mixture of 2,4- and 3,4-dichloro-5-methylbenzoic acids as a product of the process.

10. A process for preparing a mixture of 2,4- and 3,4-dichlorobenzoic acids which comprises reacting together in a solvent at a temperature up to 145 degrees centigrade four to six moles of an alkali metal hydroxide and one mole of 1,4,5,6-tetrachlorobicyclo-(2.2.1)-5-heptene-7-one, acidifying the resultant metal salt to the free acid, and recovering a mixture of 2,4- and 3,4-dichlorobenzoic acids as a product of the process.

11. A process for preparing an alkali metal salt of a compound having the following formula:

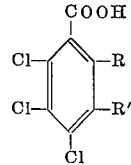

wherein R and R' are selected from the group consisting of hydrogen, alkyl containing from one to ten carbon atoms, phenyl, chloro-substituted phenyl, nitro-substituted phenyl, mixtures thereof, and carboxyl, and wherein R and R' form a cycloalkyl group having five to six carbon atoms when R and R' form a ring, which comprises reacting together in a solvent and at a temperature up to about 145 degrees centigrade at least three moles of an alkali metal hydroxide and one mole of a compound having the following formula:

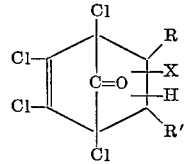

wherein X is selected from the group consisting of chlorine and bromine, and wherein R and R' are defined as above.

12. A process according to claim 11 wherein said alkali metal salt is acidified to the free acid, and the resultant product is recovered.

13. A process according to claim 11 wherein there are employed from four to six moles of an alkali metal hydroxide selected from the group consisting of sodium hydroxide and potassium hydroxide.

14. A process according to claim 11 wherein the solvent is a lower alkanol.

15. A process according to claim 12 wherein the alkali metal salt is acidified with hydrochloric acid.

16. A process for preparing 2,3,4-trichloro-5,6,7,8-tetrahydro-1-naphthoic acid which comprises reacting together in a solvent and at a temperature up to 145 degrees centigrade from four to six moles of an alkali metal hydroxide and one mole of 1,2,3,4,5-pentachlorotricyclo-(6.2.1.0$^{5,10}$)-undecane-11-one; acidifying the resulting alkali metal salt to the free acid; and recovering 2,3,4-trichloro-5,6,7,8-tetrahydro-1-naphthoic acid as the product of the process.

17. A process for preparing 2,3,4-trichlorobenzoic acid which comprises reacting together in a solvent and at a temperature up to 145 degrees centigrade from four to six moles of a alkali metal hydroxide and one mole of 1,2,4,5,6-pentachlorobicyclo - (2.2.1) - 5-heptene-7-one; acidifying the resulting alkali metal salt to the free acid; and recovering 2,3,4-trichlorobenzoic acid as the product of the process.

18. A process for preparing 1,2,3-tricarboxy-4,5,6-trichlorobenzene which comprises reacting together in a solvent and at a temperature up to 145 degrees centigrade from four to six moles of an alkali metal hydroxide and one mole of 2,3-dicarboxy-1,2,4,5-pentachlorobicyclo-(2.2.1)-5-heptene-7-one; acidifying the resulting alkali metal salt to the free acid; and recovering 1,2,3-tricarboxy-4,5,6-trichlorobenzene as the product of the process.

19. A process for preparing 2,3,4-trichloro-5-methylbenzoic acid which comprises reacting together in a solvent and at a temperature up to 145 degrees centigrade from four to six moles of a alkali metal hydroxide and one mole of 1,3,4,5,6-pentachloro - 3 - methylbicyclo-(2.2.1)-5-heptene-7-one; acidifying the resultant alkali metal salt to the free acid; and recovering 2,3,4-trichloro-5-methylbenzoic acid as the product of the process.

20. A process for preparing 2,3,4-trichloro-6-phenylbenzoic acid which comprises reacting together in a solvent and at a temperature up to 145 degrees centigrade from four to six moles of an alkali metal hydroxide and one mole of 1,3,4,5,6-pentachloro - 2 - phenylbicyclo-(2.2.1)-5-heptene-7-one; acidifying the resultant alkali metal salt to the free acid; and recovering 2,3,4-trichloro-6-phenylbenzoic acid as the product of the process.

References Cited by the Examiner

Allen et al., "J. Organic Chem.," vol 10, pages 333 to 340 (1945).

McBee et al., "J. A. C. S.," vol. 64, pages 385 to 387 (1955).

LORRAINE A. WEINBERGER, *Primary Examiner.*